(12) United States Patent
Smyers et al.

(10) Patent No.: US 7,720,821 B1
(45) Date of Patent: May 18, 2010

(54) METHOD OF AND APPARATUS FOR WRITING AND READING TIME SENSITIVE DATA WITHIN A STORAGE DEVICE

(75) Inventors: Scott D. Smyers, San Jose, CA (US); Harold Aaron Ludtke, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 716 days.

(21) Appl. No.: 09/608,617

(22) Filed: Jun. 30, 2000

(51) Int. Cl.
 *G06F 17/30* (2006.01)
 *G06F 17/00* (2006.01)
(52) U.S. Cl. .................. 707/690; 707/694; 707/697
(58) Field of Classification Search .................. 707/102, 707/1, 6, 7, 10, 100, 101, 203, 690, 694, 707/697; 709/200, 223, 253; 710/105
See application file for complete search history.

(56) References Cited

U.S. PATENT DOCUMENTS

| | | | |
|---|---|---|---|
| 3,836,722 A | 9/1974 | Muller et al. | 179/15 BS |
| 3,906,484 A | 9/1975 | Melvin, Jr. et al. | 340/347 DD |
| 4,218,756 A | 8/1980 | Fraser | 364/900 |
| 4,298,932 A | 11/1981 | Sams | 364/200 |
| 4,409,656 A | 10/1983 | Anderson et al. | 364/200 |
| 4,410,983 A | 10/1983 | Cope | 371/8 |
| 4,493,021 A | 1/1985 | Agrawal et al. | 364/200 |
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |

(Continued)

FOREIGN PATENT DOCUMENTS

EP 0 383 437 A2 2/1989

(Continued)

OTHER PUBLICATIONS

"The Parallel Protocol Engine" Matthias Kaiserswerth, IEEE/ACM Transactions on Networking, Dec. 1993, New York, pp. 650-663.

(Continued)

*Primary Examiner*—Mohammad Ali
*Assistant Examiner*—Marc R Filipczyk
(74) *Attorney, Agent, or Firm*—Haverstock & Owens LLP

(57) ABSTRACT

A media storage device records a meta-data header with packets received by the media storage device. The meta-data headers include a cycle mark value and a cycle count value. The cycle mark value has a specific pattern which is then used to locate cycle boundaries within the recorded stream of data. The cycle count value specifies the value of the isochronous cycle number on which the packet was received. Preferably, the media storage device includes an embedded stream processor which is responsible for appropriately adding the meta-data header to the packets within the recorded stream of data. The embedded stream processor is also integral to the playback of recorded data, and is used to retrieve data from the storage media, strip the meta-data headers from retrieved data being played back and recover from any error conditions encountered during the playback of previously recorded data. The meta-data headers stored within the recorded stream of data are also utilized to recover from any error conditions and resynchronize the transmission of the data during playback.

31 Claims, 8 Drawing Sheets

U.S. PATENT DOCUMENTS

| | | | |
|---|---|---|---|
| 5,007,013 A | 4/1991 | Elms | 364/900 |
| 5,008,819 A | 4/1991 | Gorbatenko | 364/200 |
| 5,008,879 A | 4/1991 | Fischer et al. | 370/85.2 |
| 5,052,029 A | 9/1991 | James et al. | 375/107 |
| 5,191,418 A | 3/1993 | Tran | 358/142 |
| 5,208,807 A | 5/1993 | Gass et al. | 370/60.1 |
| 5,287,478 A | 2/1994 | Johnston et al. | 395/425 |
| 5,331,320 A | 7/1994 | Cideciyan et al. | 341/56 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,985 A | 5/1995 | Cantrell et al. | 395/325 |
| 5,432,650 A | 7/1995 | Nunomura et al. | 360/27 |
| 5,465,402 A | 11/1995 | Ono et al. | 455/161.2 |
| 5,473,362 A | 12/1995 | Fitzgerald et al. | 348/7 |
| 5,493,570 A | 2/1996 | Hillman et al. | 370/105.3 |
| 5,499,344 A | 3/1996 | Elnashar et al. | 395/250 |
| 5,506,846 A | 4/1996 | Edem et al. | 370/94.2 |
| 5,509,126 A | 4/1996 | Oprescu et al. | 395/307 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | Delager et al. | 370/60.1 |
| 5,535,204 A | 7/1996 | Kawakami et al. | 370/84 |
| 5,537,408 A | 7/1996 | Branstad et al. | 370/79 |
| 5,544,324 A * | 8/1996 | Edem et al. | 709/231 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,561,427 A | 10/1996 | Coleman, Jr. | 341/100 |
| 5,566,174 A | 10/1996 | Sato et al. | 370/84 |
| 5,579,278 A | 11/1996 | McLaury | 365/230.05 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,640,286 A | 6/1997 | Acosta et al. | 360/48 |
| 5,640,392 A | 6/1997 | Hayashi | 370/395 |
| 5,640,592 A | 6/1997 | Rao | 370/5 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,661,848 A | 8/1997 | Bonke et al. | 395/439 |
| 5,664,124 A | 9/1997 | Katz et al. | 395/309 |
| 5,668,948 A | 9/1997 | Belknap et al. | 395/200.61 |
| 5,671,441 A | 9/1997 | Glassen et al. | 395/828 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,678 A | 11/1997 | Stallmo et al. | 395/441 |
| 5,689,727 A | 11/1997 | Bonke et al. | 395/840 |
| 5,691,994 A | 11/1997 | Acosta et al. | 371/40.1 |
| 5,692,211 A | 11/1997 | Gulick et al. | 395/800 |
| 5,696,924 A | 12/1997 | Robertson et al. | 395/412 |
| 5,699,503 A | 12/1997 | Bolosky et al. | 395/182.04 |
| 5,704,052 A | 12/1997 | Wu et al. | 395/380 |
| 5,706,439 A | 1/1998 | Parker | 395/200.17 |
| 5,708,779 A | 1/1998 | Graziano et al. | 395/200.8 |
| 5,710,773 A | 1/1998 | Shiga | 370/512 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,761,652 A | 6/1998 | Wu et al. | 707/2 |
| 5,764,972 A | 6/1998 | Crouse et al. | 395/601 |
| 5,774,683 A | 6/1998 | Gulick | 395/309 |
| 5,781,599 A | 7/1998 | Shiga | 375/376 |
| 5,781,615 A | 7/1998 | Bales et al. | 379/89 |
| 5,787,256 A | 7/1998 | Marik et al. | 395/200.68 |
| 5,790,852 A | 8/1998 | Salm | 395/674 |
| 5,790,886 A | 8/1998 | Allen | 395/825 |
| 5,793,953 A | 8/1998 | Yeung et al. | 395/200.8 |
| 5,809,249 A | 9/1998 | Julyan | 395/200.53 |
| 5,812,883 A | 9/1998 | Rao | 395/8.94 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,832,297 A | 11/1998 | Ramagopal et al. | 395/825 |
| 5,835,694 A | 11/1998 | Hodges | 395/182.04 |
| 5,835,726 A | 11/1998 | Shwed et al. | 709/229 |
| 5,835,793 A | 11/1998 | Li et al. | 395/898 |
| 5,848,253 A | 12/1998 | Walsh et al. | 395/309 |
| 5,884,103 A | 3/1999 | Terho et al. | 710/22 |
| 5,887,145 A | 3/1999 | Harari et al. | 395/282 |
| 5,893,148 A | 4/1999 | Genduso et al. | 711/132 |
| 5,928,331 A | 7/1999 | Bushmitch | 709/231 |
| 5,938,752 A | 8/1999 | Leung et al. | 710/126 |
| 5,946,298 A | 8/1999 | Okuyama | 370/232 |
| 5,960,036 A | 9/1999 | Johnson et al. | 375/219 |
| 5,960,152 A | 9/1999 | Sawabe et al. | 386/98 |
| 5,970,236 A | 10/1999 | Galloway et al. | 395/500.44 |
| 5,987,126 A | 11/1999 | Okuyama et al. | 380/5 |
| 5,991,520 A | 11/1999 | Smyers et al. | 395/280 |
| 6,012,117 A * | 1/2000 | Traw et al. | 710/123 |
| 6,044,418 A | 3/2000 | Muller | 710/56 |
| 6,064,676 A | 5/2000 | Slattery et al. | 370/412 |
| 6,085,270 A | 7/2000 | Gulick | 710/100 |
| 6,145,039 A | 11/2000 | Ajanovic et al. | 710/105 |
| 6,223,251 B1 | 4/2001 | Nemoto | 711/114 |
| 6,233,637 B1 | 5/2001 | Smyers et al. | 710/129 |
| 6,243,778 B1 | 6/2001 | Fung et al. | 710/113 |
| 6,247,069 B1 | 6/2001 | Smyers | 710/8 |
| 6,266,751 B1 | 7/2001 | Niescier | 711/173 |
| 6,282,597 B1 | 8/2001 | Kawamura | 710/105 |
| 6,292,844 B1 | 9/2001 | Smyers et al. | 710/5 |
| 6,334,161 B1 | 12/2001 | Suzuki et al. | 710/29 |
| 6,339,818 B1 | 1/2002 | Olszewski et al. | 711/173 |
| 6,374,314 B1 | 4/2002 | Darnell et al. | 710/52 |
| 6,374,317 B1 | 4/2002 | Ajanovic et al. | 710/105 |
| 6,385,672 B1 | 5/2002 | Wang et al. | 710/56 |
| 6,438,604 B1 * | 8/2002 | Kuver et al. | 709/234 |
| 6,480,936 B1 | 11/2002 | Ban et al. | 711/118 |
| 6,560,200 B1 * | 5/2003 | Shinozuka | 370/241 |
| 6,675,177 B1 * | 1/2004 | Webb | 707/200 |
| 6,859,846 B2 | 2/2005 | Swidler et al. | 710/8 |
| 7,117,222 B2 * | 10/2006 | Santosuosso | 707/101 |
| 7,529,780 B1 * | 5/2009 | Braginsky et al. | 707/203 |

FOREIGN PATENT DOCUMENTS

| | | |
|---|---|---|
| EP | 0 428 111 A2 | 5/1991 |
| EP | 0 499 394 A1 | 8/1992 |
| EP | 0 588 046 A1 | 3/1994 |
| EP | 0 703 713 A2 | 1/1996 |
| EP | 0 696 853 A2 | 2/1996 |
| EP | 0 789 502 A2 | 8/1997 |
| EP | 0 860 823 A1 | 8/1998 |
| ER | 0 535 434 A2 | 4/1993 |
| JP | 5-165687 | 7/1993 |
| JP | 165687 | 7/1993 |
| JP | 411025596 A | 1/1999 |
| JP | 02000078428 A | 3/2000 |

| | | |
|---|---|---|
| JP | 02000151681 A | 5/2000 |
| TW | 328997 | 4/1998 |
| WO | WO 97 33230 | 9/1997 |
| WO | WO 98 02881 | 1/1998 |
| WO | WO 98 47271 | 10/1998 |

OTHER PUBLICATIONS

"The Programmable Protocol VLSI Engine (PROVE)" A.S. Krishnakumar, W.C. Fischer, and Krishan Sabnani, IEEE Transactions on Communications, Aug. 1994, New York, pp. 2630-2642.

"A Bus on a Diet-The Serial Bus Alternative" Michael Teener, CompCon92, Feb. 24-28, 1992, pp. 316-321.

"Local Area Network Protocol for Autonomous Control of Attached Devices" Software Patent Institute, 1995, 1996.

"Architecture for High Performance Transparent Bridges" Software Patent Institute, 1995, 1996.

"Access to High-Speed LAN via Wireless Media" Software Patent Institute, 1995, 1996.

"Asynchronous Transfer Mode" Julia L. Heeter, Dec. 12, 1995.

"The SerialSoft IEEE 1394 Developer Tool" Skipstone.

"Data link driver program design for the IBM token ring network PC adapter" Gee-Swee Poo and Wilson Ang, Computer Communications, 1989, London, Great Britain, pp. 266-272.

"Fiber Channel (FSC)/ATM interworking: A design solution" A. Anzaloni, M. De Sanctis, F. Avaltroni, G. Rulli, L. Proietti and G. Lombardi, Ericsson Fatme R&D Division, Nov. 1993, pp. 1127-1133.

"Data Exchange Adapter for Micro Channel/370" Software Patent Institute, 1995, 1996.

American National Standards Institute X3T10 Technical Committee, *Information Technology—Serial Bus Protocol 2 (SBP-2)*, Project 1155D, Revision 1e, Nov. 9, 1996.

IEEE, "1394 Standard for a High Performance Serial Bus," 1995, USA.

"IEEE 1394, The Cable Connection to Complete the Digital Revolution," Daniel Moore.

"1394 200 Mb/s PHYsical Layer Transceiver," IBM Microelectronics, Product Data Sheet and Application Notes, Version 1.4, Mar. 14, 1996.

"IEEE 1394-1995 Triple Cable Transceiver/ Arbiter," Texas Instruments TSB21LV03, Product Preview, Revision0.99, Mar. 19, 1996.

"The IEEE-1394 High Speed Serial Bus." R.H.J. Bloks, Phillips Journal of Research, vol. 50, pp. 209-216, Jul. 1996.

Hoffman, et al., "IEEE 1394: A Ubiquitous Bus," Digest of Papers of the Computer Society, Computer Conference (COMPCON) Technologies for the Information Superhighway, Mar. 5, 1999 pp. 334-338.

"The Raid Book, A Storage System Technology Handbook," Paul Massiglia, Sixth Edition, 1997.

* cited by examiner

METHOD OF AND APPARATUS FOR WRITING AND READING TIME SENSITIVE DATA WITHIN A STORAGE DEVICE

FIELD OF THE INVENTION

The present invention relates to the field of writing data to and reading data from a media storage device. More particularly, the present invention relates to the field of writing time sensitive data to and reading time sensitive data from a media storage device.

BACKGROUND OF THE INVENTION

The IEEE Std 1394-1995 standard, "1394 Standard For A High Performance Serial Bus," is an international standard for implementing an inexpensive high-speed serial bus architecture which supports both asynchronous and isochronous format data transfers. In addition, the IEEE 1394-1995 bus has a universal clock called the cycle timer. This clock is synchronized on all nodes. Isochronous data transfers are real-time transfers which take place based on the universal clock such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394-1995 standard bus architecture provides multiple independent channels for isochronous data transfer between applications. A six bit channel number is broadcast with the data to ensure reception by the appropriate application. This allows multiple applications to simultaneously transmit isochronous data across the bus structure. Asynchronous transfers are traditional reliable data transfer operations which take place as soon as arbitration is won and transfer a maximum amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices in other connection schemes. Devices can be added and removed from an IEEE 1394-1995 bus while the bus is operational. If a device is so added or removed the bus will then automatically reconfigure itself for transmitting data between the then existing nodes. A node is considered a logical entity with a unique address on the bus structure. Each node provides in a standard address space, an identification ROM, a standardized set of control registers and in addition, its own address space.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device and the IEEE 1394-1995 cable. The physical layer 16 also provides arbitration to ensure that all devices coupled to the IEEE 1394-1995 bus have arbitrated access to the bus as well as actual data transmission and reception. The link layer 14 provides data packet delivery service for both asynchronous and isochronous data packet transport. This supports both asynchronous data transport, using an acknowledgement protocol, and isochronous data transport, providing an un-acknowledged real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

The IEEE 1394-1995 cables connect ports together on different nodes. Each port includes terminators, transceivers and logic. A node can have multiple ports at its physical connection. The cable and ports act as bus repeaters between the nodes to simulate a single logical bus. The cable physical connection at each node includes one or more ports, arbitration logic, a resynchronizer and an encoder. Each of the ports provide the cable media interface into which the cable connector is connected. The arbitration logic provides access to the bus for the node. The resynchronizer takes received data-strobe encoded data bits and generates data bits synchronized to a local clock for use by the applications within the node. The encoder takes either data being transmitted by the node or data received by the resynchronizer, which is addressed to another node, and encodes it in data-strobe format for transmission across the IEEE 1394-1995 serial bus. Using these components, the cable physical connection translates the physical point-to-point topology of the cable environment into a virtual broadcast bus, which is expected by higher layers of the system. This is accomplished by taking all data received on one port of the physical connection, resynchronizing the data to a local clock and repeating the data out of all of the other ports from the physical connection.

Each isochronous data packet includes at least an IEEE 1394-1995 packet header. The packet header includes overhead information necessary for proper communication of the packet. Typically, content data, such as audio-visual data, is included in the packet, in a data field following the packet header. When an isochronous data packet is received, the receiving device must generally separate the header information from the content data so that the content data can be appropriately processed, such as for display. The data field may contain a header and audio-visual content data, as when the CIP Transport Protocol is used. This header within the data field is the CIP header.

A hard disk drive including an IEEE 1394-1995 serial bus interface is illustrated in FIG. 2. The hard disk drive 20 includes the IEEE 1394-1995 serial bus interface circuit 22 for interfacing to an IEEE 1394-1995 serial bus network. The interface circuit 22 is coupled to a buffer controller 24. The buffer controller 24 is coupled to a random access memory (RAM) 26 and to a read/write channel circuit 28. The read/write channel circuit 28 is coupled to the media 30 on which data is stored within the hard disk drive 20. The read/write channel circuit 28 controls the storage operations on the media 30, including reading data from the media 30 and writing data to the media 30.

During a write operation to the hard disk drive 20, a stream of data is received from a device coupled to the IEEE 1394-1995 serial bus structure by the IEEE 1394-1995 interface circuit 22. This stream of data is forwarded from the IEEE 1394-1995 interface circuit 22 to the buffer controller 24. The buffer controller 24 then stores this data temporarily in a buffer in the RAM 26. When the read/write channel circuit 28 is available, the buffer controller 24 reads the data from the RAM 26 and forwards it to the read/write channel circuit 28. The read/write channel circuit 28 then writes the data onto the media 30.

During a read operation from the hard disk drive 20, a stream of data is read from the media 30 by the read/write channel circuit 28. This stream of data is forwarded by the read/write channel circuit 28 to the buffer controller 24. The buffer controller 24 then stores this data temporarily in a buffer in the RAM 26. When the IEEE 1394-1995 serial bus interface circuit 22 is available, the buffer controller 24 reads the data from the RAM 26 and forwards it to the interface circuit 22. The IEEE 1394-1995 serial bus interface circuit 22 then formats the data according to the requirements of the IEEE 1394-1995 standard and transmits this data to the appropriate device or devices over the IEEE 1394-1995 serial bus.

A traditional hard disk drive 20, as described, records data and plays it back according to commands received from an external controller using a protocol such as the serial bus protocol (SBP). The external controller provides command data structures to the hard disk drive 20 which inform the hard disk drive 20 where on the media 30 the data is to be written, in the case of a write operation, or read from, in the case of a read operation. The function of the hard disk drive 20 during a read operation is to recreate the original, unmodified stream of data which was previously written on the media 30.

When recording such data, the hard disk drive 20 does not necessarily understand or is unable to use the data. The hard disk drive 20 is typically employed to record the data in a manner to preserve the integrity of the data when the data is read and transmitted from the hard disk drive 20 to another device within the IEEE 1394-1995 serial bus network. However, this can be a problem when the hard disk drive 20 has recorded a stream of isochronous data which must be transmitted in packets at appropriate intervals. Especially, when the hard disk drive 20 cannot understand the data and differentiate particular boundaries within the data stream. This makes it difficult for the hard disk drive 20 to record the data and then later retrieve it for transmission over the network in the correct format and order.

In a draft of the SBP2 protocol standard an isochronous recording format was proposed for recording isochronous data. Within this proposal, the first quadlet of each logical block within the hard disk drive was reserved. When isochronous data was saved within this logical block, this reserved quadlet would then be used to save a pointer to the first cycle start packet within the logical block. This pointer could then be used to determine the appropriate order of the data and to locate specified locations within the data stream.

SUMMARY OF THE INVENTION

A media storage device records a meta-data header with packets received by the media storage device. The meta-data headers include a cycle mark value and a cycle count value. The cycle mark value has a specific pattern which is then used to locate cycle boundaries within the recorded stream of data. The cycle count value specifies the value of the isochronous cycle number on which the packet was received. Preferably, the media storage device includes an embedded stream processor which is responsible for appropriately adding the meta-data header to the packets within the recorded stream of data. The embedded stream processor is also integral to the playback of recorded data, and is used to retrieve data from the storage media, strip the meta-data headers from retrieved data being played back and recover from any error conditions encountered during the playback of previously recorded data. The meta-data headers stored within the recorded stream of data are also utilized to recover from any error conditions and resynchronize the transmission of the data during playback.

In one aspect of the present invention, a method of writing data to a media storage device comprises receiving a received packet of data to be written to the media storage device, adding a header to the received packet of data thereby forming an extended packet of data and storing the extended packet of data onto a media within the media storage device. The header includes a cycle mark value which includes a pattern used to locate cycle boundaries, and a cycle count value specifying a cycle number of a cycle in which the received packet of data was received. The received packet of data is an isochronous packet of data received over an isochronous channel. Receiving the received packet of data includes receiving packets of data on multiple channels and further wherein adding a header to the received packet of data includes grouping packets received on multiple channels within a same isochronous cycle into a cycle group of packets and adding the header to the cycle group of packets. Adding a header to the received packet of data is performed by an embedded stream processor within the media storage device. The received packet of data is preferably received from a bus structure which substantially complies with a version of an IEEE 1394 standard. The media storage device is preferably a hard disk drive.

In another aspect of the present invention, a method of reading data from a media storage device which has previously been stored with header data generated by the media storage device comprises locating a first header data, including a cycle mark value having a pattern, reading a previously stored packet of data following the first header data from a media within the media storage device, stripping the first header data from the previously stored packet of data thereby forming a retrieved packet of data and transmitting the retrieved packet of data to another device. Transmitting includes transmitting the manipulated packet of data onto a bus structure which preferably substantially complies with a version of an IEEE 1394 standard. The pattern is used to locate cycle boundaries, and the first header data further includes a cycle count value specifying a cycle number of a cycle in which the previously stored packet of data was received. The retrieved packet is an isochronous packet of data and is transmitted over an isochronous channel. Stripping the first header data from the previously stored packet of data is performed by an embedded stream processor within the media storage device. The media storage device is preferably a hard disk drive. Locating the first header data, including a cycle mark value having a pattern includes locating the pattern within the previously stored data, then determining if a cycle count value within the first header data is within an appropriate range, determining if an isochronous header follows the first header data and then determining if a data length value includes a legitimate value. The appropriate range for the cycle count value is any number including and between 0 and 7999. The appropriate range for the data length value is format dependent.

In yet another aspect of the present invention, a method of recovering from an error condition during playback of a recorded stream of data including packets of data and header data comprises locating a next header data, including a cycle mark value having a pattern, determining if a cycle count value within the next header data is within an appropriate range and determining if an isochronous header follows the next header data. The method further comprises determining if a data length value includes a legitimate value. The appropriate range for the cycle count value is any number including and between 0 and 7999. The appropriate range for the data length value is format dependent.

In still yet another aspect of the present invention, a meta data header added to received packets by a media storage device as the packets are recorded on storage media within the media storage device comprises a cycle mark value including a pattern used to locate cycle boundaries within the received packets and a cycle count value specifying a cycle number of a cycle in which the received packets are received. The cycle count value preferably has a range between and including 0 and 7999. The received packets are preferably isochronous data packets. Preferably, the meta data header is added to each received packet. Alternatively, the meta data header is added to each group of received packets received during a same isochronous cycle.

In another aspect of the present invention, a media storage device comprises means for interfacing configured for receiving a stream of data, thereby forming a received stream of data, and also for transmitting a retrieved stream of data, means for storing data for storing and retrieving the received stream of data and means for processing coupled to the means for interfacing and to the means for storing for adding header data to the received stream of data as the received stream of data is received and providing the header data and the received stream of data to the means for storing for recording thereby forming a recorded stream of data, the header data including a cycle mark value marking cycle boundaries within the recorded stream of data. The means for processing is preferably an embedded stream processor which also locates a first cycle mark value within the recorded stream of data during a playback operation, reads packets within the recorded stream of data after the first cycle mark value, strips the header data from read packets within the recorded stream of data thereby forming retrieved packets of data and transmits the retrieved packets of data through the means for interfacing to a receiving device. The receiving device is coupled to the means for interfacing by a bus structure which preferably substantially complies with a version of an IEEE 1394 standard. The embedded stream processor locates the first cycle mark value by locating a pattern included within the cycle mark value, then determining if a cycle count value within the header data is within an appropriate range, determining if an isochronous header follows the header data and then determining if a data length value includes a legitimate value. The appropriate range for the cycle count value is any number including and between 0 and 7999. The appropriate range for the data length value is format dependent. The header data further includes a cycle count value specifying a cycle number of a cycle in which packets of data within the received stream of data were received.

In still yet another aspect of the present invention, a media storage device comprises an interface circuit configured to receive a stream of data, thereby forming a received stream of data, and also to transmit a retrieved stream of data, storage media configured to store and retrieve the received stream of data and an embedded stream processor coupled to the interface circuit and to the storage media to add header data to the received stream of data as it is received and provide the header data and the received stream of data to the storage media for recording to form a recorded stream of data, the header data including a cycle mark value marking cycle boundaries within the recorded stream of data. The embedded stream processor also locates a first cycle mark value within the recorded stream of data during a playback operation, reads packets within the recorded stream of data after the first cycle mark value, strips the header data from read packets within the recorded stream of data thereby forming retrieved packets of data and transmits the retrieved packets of data through the interface circuit to a receiving device. The receiving device is coupled to the media storage device by a bus structure which preferably substantially complies with a version of an IEEE 1394 standard. The embedded stream processor locates the first cycle mark value by locating a pattern included within the cycle mark value, then determining if a cycle count value within the header data is within an appropriate range, determining if an isochronous header follows the header data and then determining if a data length value includes a legitimate value. The appropriate range for the cycle count value is any number including and between 0 and 7999. The appropriate range for the data length value is format dependent. The header data further includes a cycle count value specifying a cycle number of a cycle in which packets of data within the received stream of data were received.

In yet another aspect of the present invention, a network of devices comprises a source device which generates isochronous source packets of data each including an isochronous packet header and a data payload, a receiving device which utilizes isochronous data and a media storage device including an interface circuit coupled to the source device for receiving the isochronous source packets of data, thereby forming a received stream of data, and also coupled to the receiving device for transmitting a retrieved stream of data, storage media for storing and retrieving the received stream of data and an embedded stream processor coupled to the interface circuit and to the storage media for adding header data to the received stream of data as it is received and providing the header data and the received stream of data to the storage media for recording thereby forming a recorded stream of data, the header data including a cycle mark value marking cycle boundaries within the recorded stream of data. The embedded stream processor also locates a first cycle mark value within the recorded stream of data during a playback operation, reads packets within the recorded stream of data after the first cycle mark value, strips the header data from read packets within the recorded stream of data thereby forming retrieved packets of data and transmits the retrieved packets of data through the interface circuit to the receiving device. The embedded stream processor locates the first cycle mark value by locating a pattern included within the cycle mark value, then determining if a cycle count value within the header data is within an appropriate range, determining if an isochronous header follows the header data and then determining if a data length value includes a legitimate value. The appropriate range for the cycle count value is any number including and between 0 and 7999. The appropriate range for the data length value is format dependent. The source device, the receiving device and the media storage device are preferably coupled together by a bus structure which substantially complies with a version of an IEEE 1394 standard. The header data further includes a cycle count value specifying a cycle number of a cycle in which packets of data within the received stream of data were received. The isochronous source packets each further include a CIP header. The receiving device is preferably a display device.

DETAILED DESCRIPTION OF THE PREFERRED EMBODIMENT

The media storage device of the present invention maps an incoming stream of data which is to be recorded on storage media within the media storage device in order that significant points within the stream of data can be efficiently found during the playback of the stream of data. When a stream of data is recorded on the storage media within the media storage device of the present invention, a meta-data header is added by the media storage device to each incoming packet within the stream of data. Preferably, the media storage device includes an embedded stream processor which is responsible for appropriately adding this meta-data header to the stream of data. The stream of data can include data on one or more channels. The meta-data header is preferably added to the beginning of each packet within the stream, if packets are received on a single isochronous channel, and to the beginning of each group of packets within an isochronous cycle, if packets are received on multiple isochronous channels. The meta-data header includes a cycle mark value and a cycle count value. The cycle mark value marks isochronous cycle boundaries within the recorded data stream. The cycle count value specifies the value of the isochronous cycle number on which the packet or group of packets was received. The cycle count value preferably has a value between 0 and 7999.

When transmitting data which has been previously stored on storage media within the media storage device, the meta-data headers stored within the stream of data are used to locate specific locations within the stream of data during retrieving operations. The meta-data header stored with each packet or group of packets within the stream of data is also utilized if an error occurs during the transmission of a stream of data to resynchronize the stream of data and continue the transmission of the stream of data. During transmission, the stream of data is read from the storage media, processed by the media storage device and transmitted from the media storage device according to appropriate protocol conventions. The processing performed by the media storage device during transmission includes stripping the meta-data header from the packets and reformatting the packets, as appropriate, for transmission on the appropriate channel over the IEEE 1394-1995 serial bus. This processing is preferably performed by the embedded stream processor within the media storage device.

Preferably, the embedded stream processor within the media storage device includes fixed firmware for performing the appropriate manipulations of data, as described herein, including adding the meta-data to each packet as it is stored on the storage media and stripping the meta-data from each packet as it is read from the storage media. Alternatively, the embedded stream processor is programmed by an external controller within the IEEE 1394-1995 serial bus network which is controlling the media storage device.

Figure 1:
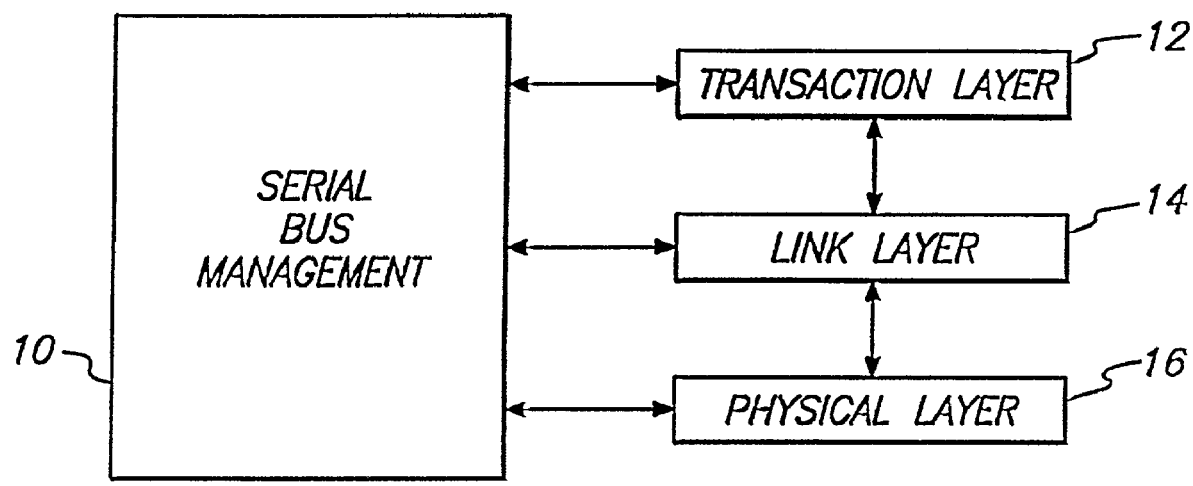
FIG. 1 illustrates a protocol stack defined by the IEEE 1394-1995 standard.
Figure 2:
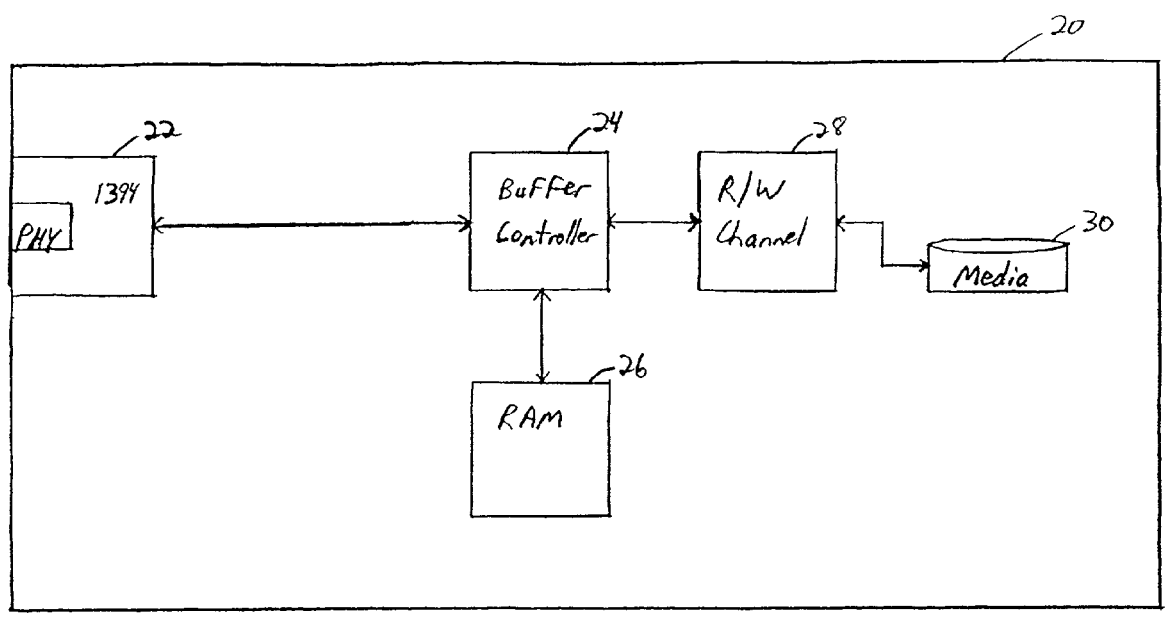
FIG. 2 illustrates a block diagram of a media storage device of the prior art.
Figure 3:
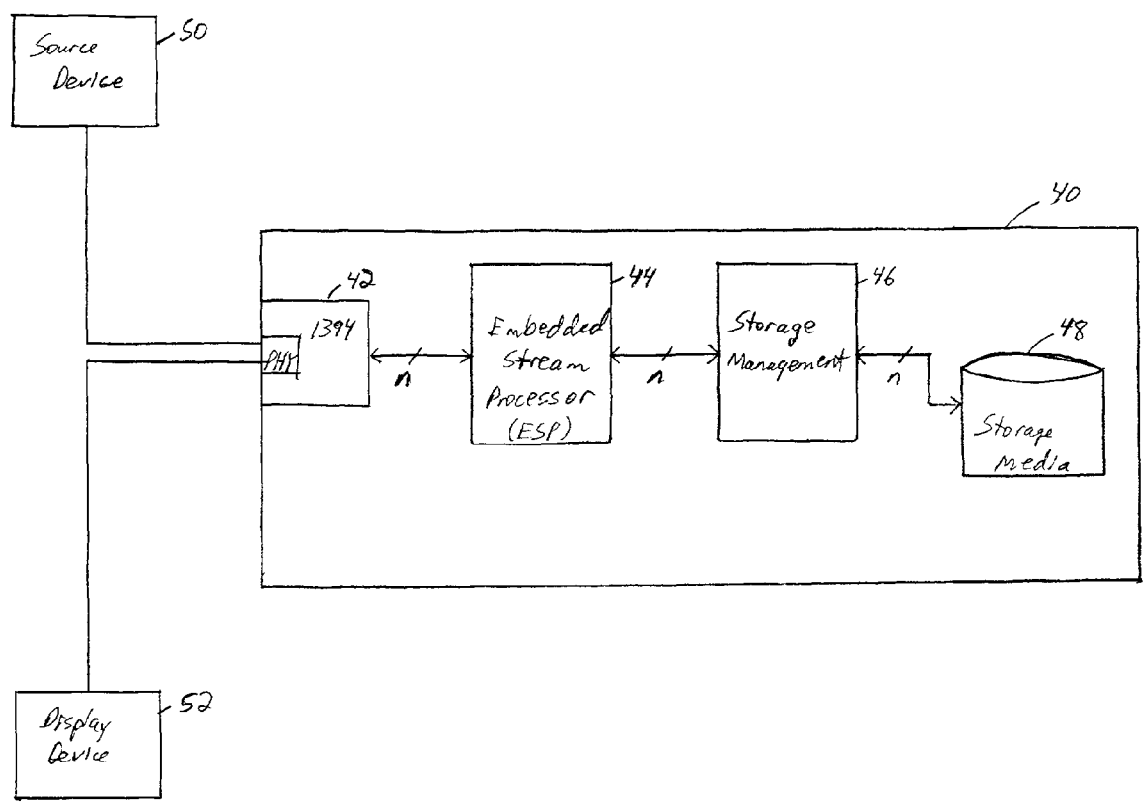
FIG. 3 illustrates a block diagram of a media storage device according to the present invention.

A media storage device according to the preferred embodiment of the present invention, within an exemplary IEEE 1394-1995 serial bus network of devices, is illustrated in FIG. 3. The media storage device 40 includes an IEEE 1394-1995 serial bus interface circuit 42 for sending communications to and receiving communications from other devices coupled to the IEEE 1394-1995 serial bus network. In the exemplary network of FIG. 3, the IEEE 1394-1995 serial bus interface circuit 42 is coupled to the source device 50 and the display device 52. Within the media storage device 40, the interface circuit 42 is coupled to an embedded stream processor 44. The embedded stream processor 44 is coupled to a storage management circuit 46. The storage management circuit 46 includes components such as the buffer controller, RAM and R/W channel, as discussed above. The storage management circuit 46 is coupled to storage media 48 on which data is stored within the media storage device 40. The storage management circuit 46 controls the storage operations on the storage media 48, including reading data from the storage media 48 and writing data to the storage media 48. The incoming and outgoing stream of IEEE 1394-1995 data to and from the media storage device 48 may contain data on multiple data channels, as illustrated in FIG. 3 by the "/n" symbols between the components within the media storage device 48.

The media storage device 40 of the present invention is preferably a hard disk drive. However, it should be apparent to those skilled in the art that the media storage device 40 could also include both fixed and removable media using any one or more of magnetic, optical or magneto-optical storage technology or any other available mass storage technology.

During a write operation to the media storage device 40, the IEEE 1394-1995 serial bus interface circuit 42 receives a stream of data from the IEEE 1394-1995 serial bus. The interface circuit 42 then forwards this data to the embedded stream processor 44. The embedded stream processor 44 adds the meta-data headers into the stream of data, as appropriate. The storage management circuit 46 then manages the storage of the stream of data including the meta-data headers onto the storage media 48.

During a read operation from the media storage device 40, a stream of data including the meta-data headers is read from the storage media 48. The storage management circuit 46 also manages the reading of the stream of data including the meta-data headers from the storage media 48 in conjunction with the embedded stream processor 44. The data read from the storage media 48 is then provided to the embedded stream processor 44, which strips the meta-data headers from the data and manipulates the data as appropriate for transmission on the IEEE 1394-1995 serial bus. Once the embedded stream processor 44 has finished manipulating the data, the IEEE 1394-1995 serial bus interface circuit 42 then formats the data according to the requirements of the IEEE 1394-1995 standard and transmits this data to the appropriate device or devices over the IEEE 1394-1995 serial bus.

The embedded stream processor 44 within the media storage device 40 of the present invention preferably includes fixed firmware for performing the appropriate manipulations of the stream of data, as described herein, including adding meta-data headers to the stream of data during write operations and stripping the meta-data headers from the stream of data during read operations. Alternatively, the embedded stream processor 44 within the media storage device 40 of the present invention is programmed by an external controlling device to perform the appropriate manipulations of the stream of data as data is written to or read from the media storage device 40. Other than adding meta-data headers to the stream of data during write operations and stripping the meta-data headers from the stream of data during read operations, the embedded stream processor 44 of the present invention can also be used to perform other appropriate manipulations of the data, as taught within U.S. patent application Ser. No. 09/022,926, filed on Feb. 12, 1998 and entitled "MEDIA STORAGE DEVICE WITH EMBEDDED DATA FILTER FOR DYNAMICALLY PROCESSING DATA DURING READ AND WRITE OPERATIONS," which is hereby incorporated by reference.

The embedded stream processor 44 is a special purpose function that handles the real-time processing of stream data, both data being written to the storage media 48 and data being read from the storage media 48. The embedded stream processor 44 preferably performs the data manipulation operations of the present invention within the media storage device 40, as described herein. The embedded stream processor 44 is preferably an isochronous data pipe. A preferred embodiment of the embedded stream processor 44 is taught in U.S. patent application Ser. No. 08/612,322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference. The embedded stream processor 44 is programmable and will execute a series of instructions on a stream of data in order to perform manipulations on the data as required to place the data in the appropriate format and add the appropriate meta-data to the data. The embedded stream processor 44 can be programmed to manipulate both asynchronous and isochronous data.

Figure 4A:
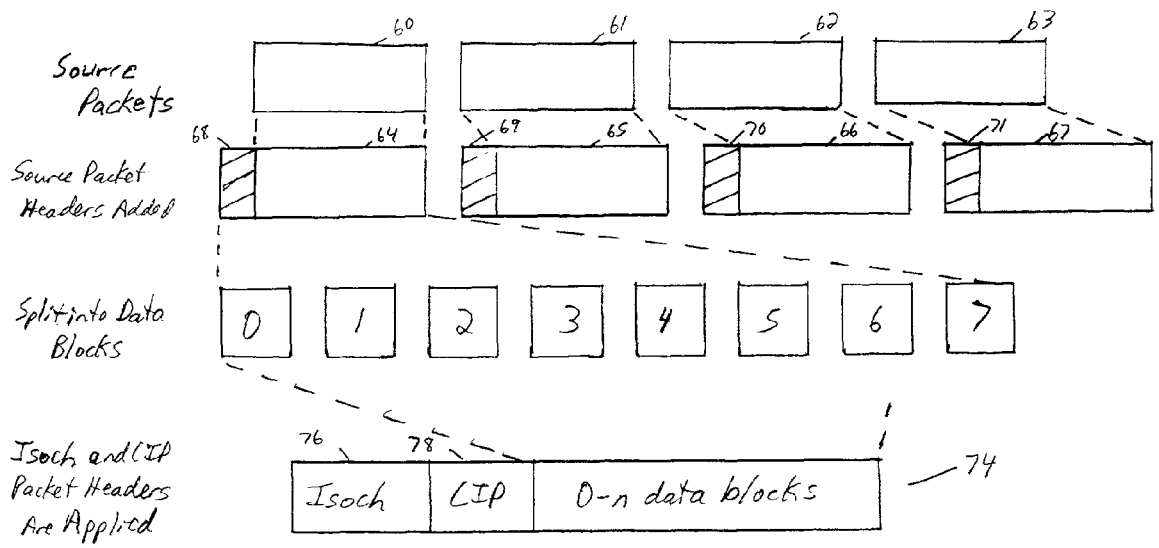
FIG. 4A illustrates the packetization of data at a source device for transmission over an IEEE 1394-1995 serial bus.

The packetization of data at a source device, such as the source device 50, for transmission over the IEEE 1394-1995 serial bus is illustrated in FIG. 4A. The series of source packets 60-63 is generated at the source device 50. The nature and form of these source packets 60-63 is dependent on the data format which they represent, which can include formats such as DV and MPEG2. The source device 50 then applies the source packet headers 68-71 to each of the source packets 60-63, respectively. The structure of the source packet headers is preferably as defined in the IEC-61883 protocol. The source device 50 then splits the combination source packets and source packet headers into data blocks, with each source packet being split into multiple data blocks. Some number of the data blocks are then combined into an isochronous packet and the isochronous header and the common isochronous packet (CIP) header are then applied to the isochronous packet by the source device 50. Each of these headers serves the purpose of defining the nature of the data that lies behind it. The CIP header is used to define the nature of the data format, such as for example an MPEG2 stream. The isochronous header is used to define the nature of the isochronous data packet. Once the isochronous and CIP headers are applied to the isochronous data packet, the packet is then transmitted by the source device 50 over the IEEE 1394-1995 serial bus to the media storage device 40 of the present invention.

Figure 4B:
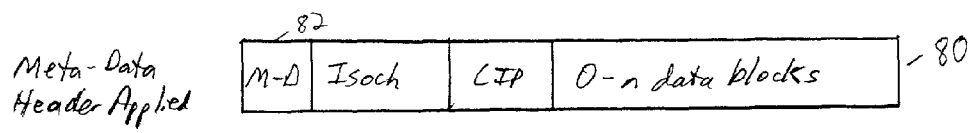
FIG. 4B illustrates the addition of the meta-data header of the present invention to a received isochronous packet.

When received by the media storage device 40, the meta-data header, as described herein is added to the received packet, as illustrated in FIG. 4B. The data packet 80 including the meta-data header 82 is then saved on the storage media 48, within the media storage device 40.

Figure 5:
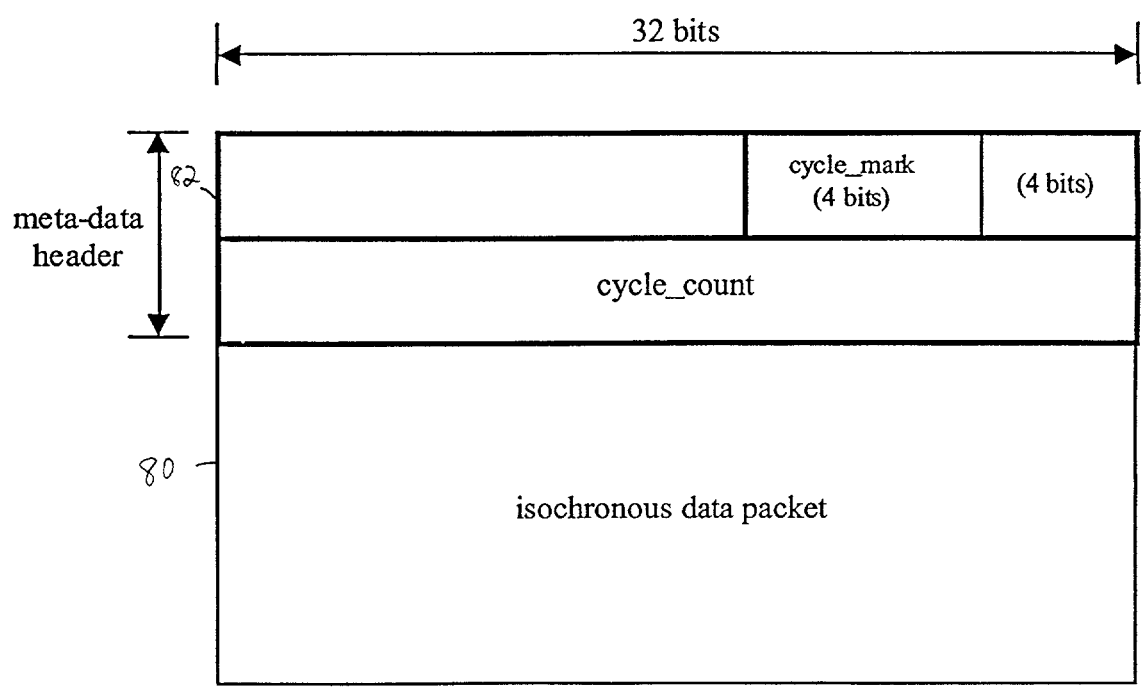
FIG. 5 illustrates a format of the meta-data header of the preferred embodiment of the present invention.

The format of the meta-data header of the preferred embodiment is illustrated in FIG. 5. Preferably, the meta-data header 82 is a two-quadlet (8 byte) data structure, which includes a cycle_mark field and a cycle_count field. The cycle_mark field is a four-bit field, preferably located within the most significant nibble of the least significant byte of the first quadlet of the meta-data header 82. The cycle_mark field includes a specific four-bit pattern and is significant because it marks isochronous cycle boundaries in the recorded data stream.

The cycle_count field is preferably a four-byte (quadlet) field, located within the second quadlet of the meta-data header 82. The cycle_count field includes a value specifying the value of the isochronous cycle number on which the packet was received. The IEEE 1394-1995 standard specifies an 8 kHz clock, with each clock cycle denoted by a counter value from 0 to 7999. This counter value is recorded within the meta-data header 82 as the cycle count value included within the cycle_count field.

Figure 6:
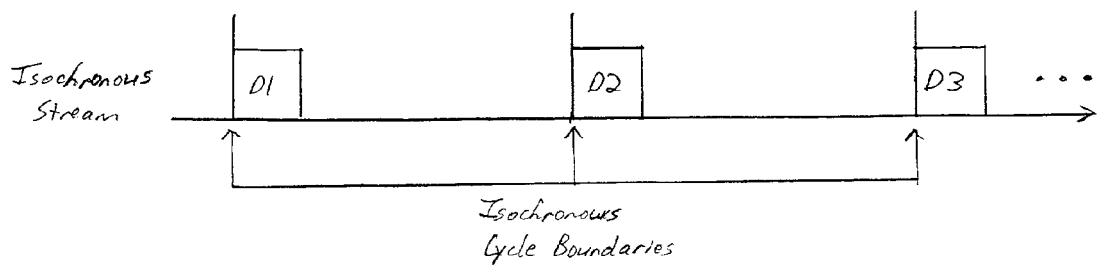
FIG. 6 illustrates an exemplary stream of isochronous packets received by the IEEE 1394-1995 serial bus interface of the media storage device of the present invention.
Figure 7:
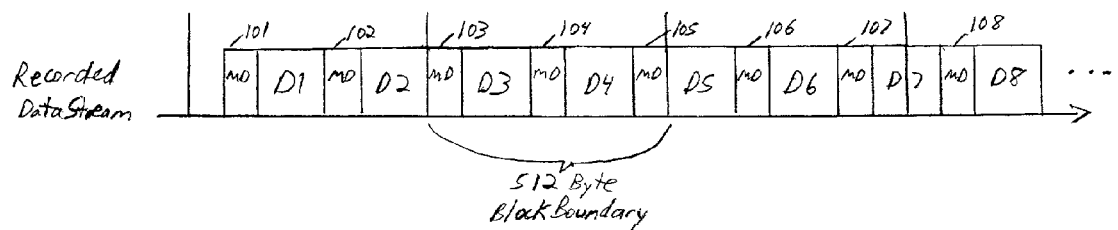
FIG. 7 illustrates an exemplary stream of isochronous packets, including pre-pended meta-data headers as recorded within the media storage device of the present invention.

An exemplary stream of isochronous packets, received by the IEEE 1394-1995 serial bus interface circuit 42 from the source device 50 on a single isochronous channel, is illustrated in FIG. 6. Each of the isochronous packets is received within its respective isochronous cycle. An exemplary stream of isochronous packets, as recorded on the storage media 48, within the media storage device 40 of the present invention is illustrated in FIG. 7. Each of the packets D1-D8 has a meta-data header 101-108, respectively, prepended to it before being written to the storage media 48. The embedded stream processor 44 prepends the meta-data header to each isochronous packet as it is received from the IEEE 1394-1995 serial bus interface circuit 42, then passes the complete packet, including the meta-data header, to the storage management circuit 46 for storage on the storage media 48.

As described above, the specific pattern within the cycle_mark field of the meta-data header marks the isochronous cycle boundaries in the recorded stream of data. These isochronous cycle boundaries are not guaranteed to fall into any special locations on the storage media 48, such as at the beginning of each data block. As illustrated in FIG. 7, the isochronous cycle boundaries, marked by the meta-data headers 101-108 can fall anywhere within the data blocks on the storage media 48 and can even be split between blocks on the storage media 48, as appropriate. Further, the data packets D1-D8 can also fall anywhere within the data blocks on the storage media 48 and can also be split between blocks on the storage media 48, as appropriate.

Within FIG. 7, 512 byte storage blocks are shown. This block size is exemplary only. It should be apparent to those skilled in the art that other block sizes could be used to store data on the storage media 48. Alternatively, the storage media 48 could also be a non-block-storage model, such as a flash RAM module. In this case, storage on such a module is generally modeled as a large sequence of bytes that can be read and written in any amount, not constrained to any specific block size.

When reading a stream of data recorded on the storage media 48 for transmission from the IEEE 1394-1995 serial bus interface circuit 42, the embedded stream processor 44 first finds and reads the storage block within the storage media 48 which contains the first data packet within the stream. The embedded stream processor 44 then scans the bytes within this storage block until it locates the specific pattern of the cycle_mark field within a meta-data header. Preferably, any bytes that are included within the storage block that precede the initial cycle_mark field are discarded and are not included in the data stream as transmitted from the interface circuit 42. Preferably, the embedded stream processor also performs further checks to ensure that this is the first data packet within the stream, by following the steps used for error recovery, as described below. Alternatively, the discovery of the specific pattern of the cycle_mark field is the only check used by the embedded stream processor to determine that the beginning of the stream has been found.

Once the beginning of the first data packet after the specific pattern of the first cycle_mark field is found, the embedded stream processor 44 then reconstructs the isochronous stream of recorded data by first reading the cycle_count value from within the meta-data header and the isochronous data packet length from the isochronous packet header. The embedded stream processor 44 then processes the data bytes for this packet and transmits them from the IEEE 1394-1995 serial bus interface circuit 42, according to the appropriate protocol conventions. The embedded stream processor 44 then continues by reading the next block of bytes and repeating the process until a stop condition occurs. The data packet length that is read by the embedded stream processor 44 from the isochronous packet header is used to assist in finding the next packet boundary, because packets are preferably stored sequentially on the storage media 48. Alternatively, if non-contiguous storage strategies are used, then the media storage device 40 is also responsible for maintaining links, according to any appropriate known manner, from one chunk of recorded data to the next chunk of recorded data on the storage media 48. Stop conditions include unrecoverable errors, encountering the end of a data stream or any other playback modification commands that are issued from higher layer protocols such as the AV/C protocol.

The storage media 48 will potentially suffer from occasional media read failures or other error conditions. If such an error occurs during the playback of a stream of recorded data, it is necessary to re-synchronize the stream in order to continue the playback from a point beyond the error. The most critical error occurs when the block of data containing a cycle_mark field or other meta-data has a read error. Such an error means that the media storage device is unable to reliably find the beginning of the upcoming isochronous cycle or packet boundary, and therefore the beginning of the appropriate data bytes, that need to be transmitted.

When such errors are encountered during the playback of a recorded stream of data, the media storage device 40 of the present invention, first scans the data bytes stored until the specific pattern of the cycle_mark field is located. This indicates to the media storage device 40 that a meta-data header might have been found. This is not entirely reliable, because in the middle of a data stream, it is possible that the actual data itself will contain the specific pattern of the cycle_mark field. However, once the specific pattern of the cycle_mark field is located, the embedded stream processor 44 then performs one or more operations to ensure that the specific pattern of the cycle_mark field found is included within a meta-data header. The choice of how many of the operations are performed is dependent on the processing power of the embedded stream processor 44. Preferably, all of the operations to ensure that the specific pattern of the cycle_mark field found is included within a meta-data header, discussed below, are performed if the embedded stream processor 44 can perform these operations while still appropriately maintaining its other operations. Alternatively, one or more of the operations are performed in order to ensure that the specific pattern of the cycle_mark field found is included within a meta-data header.

Figure 8:
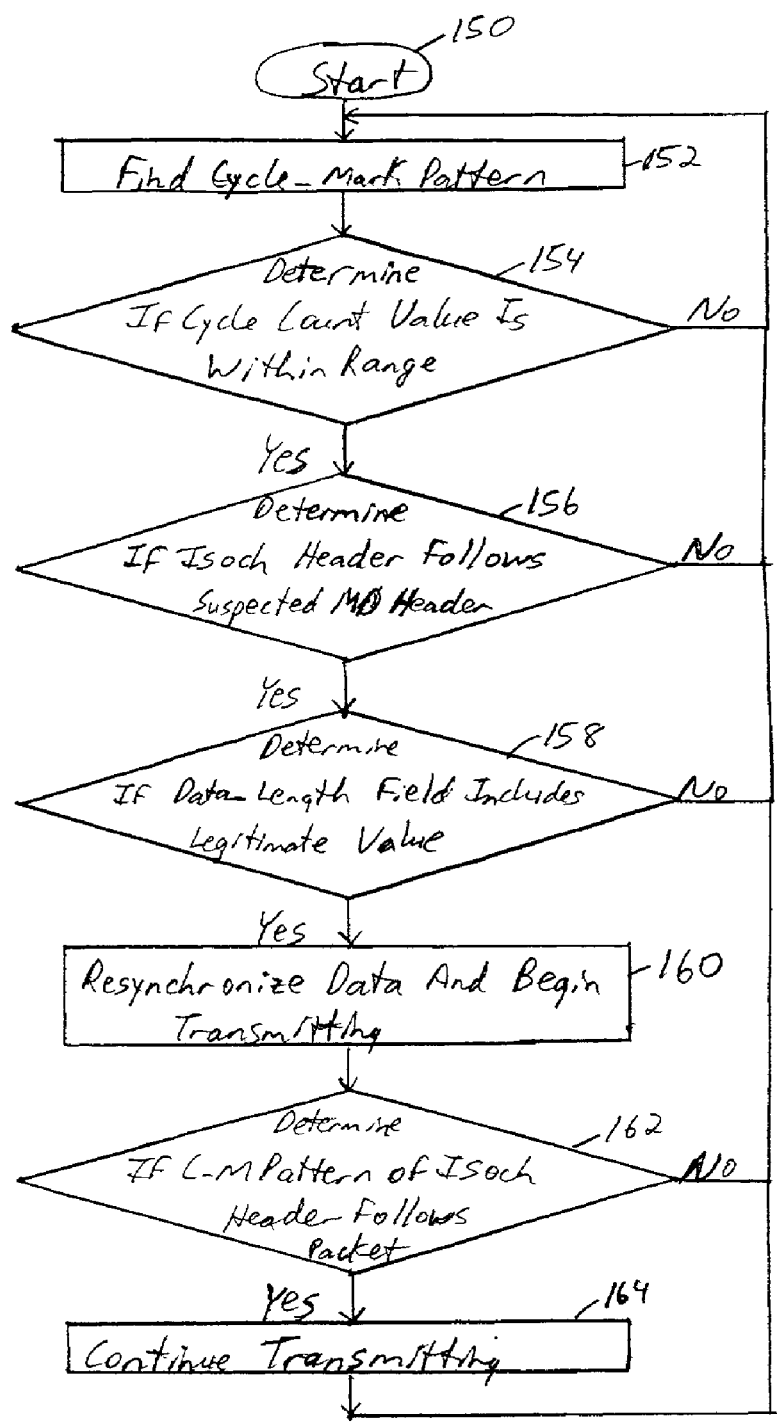
FIG. 8 illustrates a block flow diagram of error recovery operations performed by the media storage device of the present invention.

A block flow diagram of the error-recovery operations to ensure that the specific pattern of the cycle_mark field found is included within a meta-data header of the preferred embodiment of the present invention is illustrated in FIG. 8. The error-recovery process starts at the step 150. At the step 152, the embedded stream processor 44, first finds the specific pattern of the cycle_mark field, as described above. At the step 154, the embedded stream processor 44 then performs a range check on the cycle count value within the cycle_count field of the meta-data header, to determine whether or not the value within the cycle_count field is less than 8000. If it is determined at the step 154 that the cycle count value within the cycle_count field is not within the appropriate range, then the embedded stream processor 44 returns to the step 152 to continue to search for the specific pattern of the cycle_mark field.

If it is determined at the step 154 that the cycle count value within the cycle_count field is within the appropriate range, then the embedded stream processor 44 next determines, at the step 156, if an isochronous packet header follows the suspected meta-data header, by analyzing the fields and expected values within the isochronous packet header. If it is determined at the step 156 that an isochronous header does not follow the suspected meta-data header, then the embedded stream processor 44 returns to the step 152 to continue to search for the specific pattern of the cycle_mark field. However, if it is determined at the step 156 that an isochronous header does follow the suspected meta-data header, then the embedded stream processor 44 next determines, at the step 158, if the data length value within the data_length field in the packet includes a legitimate value. The data length value within the data_length field is dependent on the format of the data included within the data packet.

If it is determined at the step 158 that the data_length field does not include a legitimate value, then the embedded stream processor 44 returns to the step 152 to continue to search for the specific pattern of the cycle_mark field. However, if it is determined at the step 158 that the data_length field does include a legitimate value, then the embedded stream processor 44 has determined that it is highly likely that a valid packet and isochronous cycle boundary have been found. Accordingly, the embedded stream processor 44 then resynchronizes the data and begins transmitting the data from the IEEE 1394-1995 serial bus interface circuit 42, at the step 160. Following the transmission of the first packet, at the step 160, the embedded stream processor 44 then determines if the specific pattern of the cycle_mark field or isochronous packet header follows, at the step 162.

If it is determined at the step 162 that the specific pattern of the cycle_mark field or an isochronous packet header does not appropriately follow the preceding packet, then the embedded stream processor 44 returns to the step 152 to continue to search for the specific pattern of the cycle_mark field. However, if it is determined at the step 162 that the specific pattern of the cycle_mark field or an isochronous packet header does appropriately follow the preceding packet, then the embedded stream processor 44 continues the transmission of the stream of data, at the step 164, and then returns to the step 152 to find the specific pattern of the next cycle_mark field. It should be apparent to those skilled in the art that alternatively, additional or different error recovery operations could be performed that are device or data specific.

Figure 9:
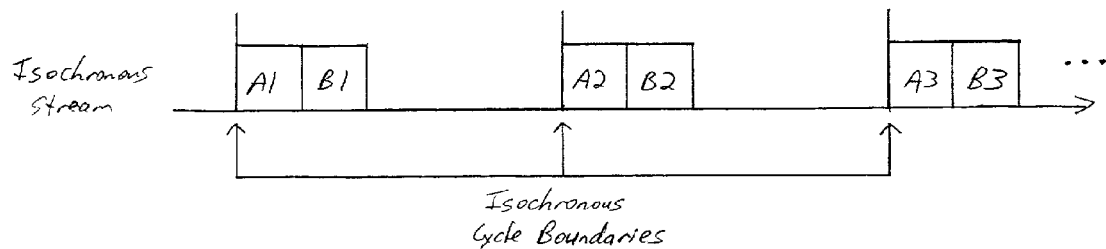
FIG. 9 illustrates an exemplary stream of isochronous packets, received by the IEEE 1394-1995 serial bus interface of the media storage device of the present invention, including packets on multiple channels.
Figure 10:
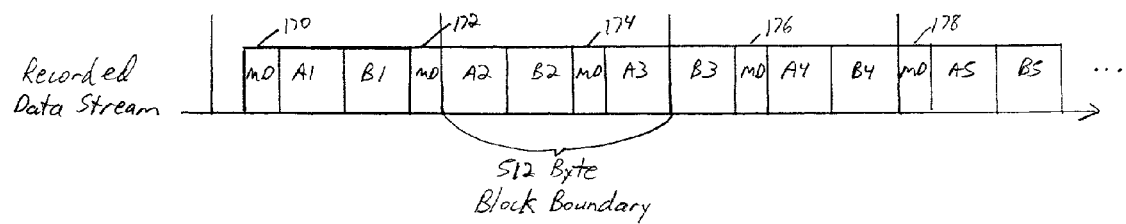
FIG. 10 illustrates an exemplary stream of isochronous packets received on multiple channels, as recorded within the media storage device of the present invention, including pre-pended meta-data headers.

While the recording of only a single isochronous channel has so far been described, the media storage device 40 of the present invention will also record packets on several isochronous channels. During playback, the media storage device 40, has the ability to then playback a stream of data including packets within one or more channels stored among packets from multiple isochronous channels. An exemplary stream of isochronous packets, received by the IEEE 1394-1995 serial bus interface circuit 42 from the source device 50, including packets on multiple channels, is illustrated in FIG. 9. Each of the isochronous packets is received within its respective isochronous cycle. In this example, as illustrated in FIG. 9, the isochronous packets are received on two separate channels. An exemplary stream of isochronous packets received on multiple channels, as recorded on the storage media 48, within the media storage device 40 of the present invention is illustrated in FIG. 10. The packets received within the multiple channels are grouped according to packets received within the same isochronous cycle. Each of the groups of packets has a meta-data header 170, 172, 174, 176 and 178 prepended to it before being written to the storage media 48. The embedded stream processor 44 prepends the meta-data header to each group of isochronous packets as it is received from the IEEE 1394-1995 serial bus interface circuit 42, then passes the complete group of isochronous packets, including the meta-data header, to the storage management circuit 46 for storage on the storage media 48.

As illustrated in FIG. 10, the packets A1 and B1 are received on different isochronous channels, but within the same isochronous cycle. The embedded stream processor 44 within the media storage device 40, preferably groups the packets A1 and B1 together as being received within the same isochronous cycle and then prepends the meta-data header to the group of packets A1 and B1, as the group of packets A1 and B1, including the meta-data header, are stored on the storage media 48. Similarly, the other received packets are grouped together with packets received during the same isochronous cycle and a meta-data header is prepended to each group of packets, as illustrated in FIG. 10.

In an alternative embodiment of the present invention, the meta-data header is prepended to a group of packets received during the same isochronous cycle and a meta-data header is also prepended to each separate packet. In this alternate embodiment, the meta-data headers are used to mark the beginning of an isochronous cycle and the beginning of each packet within the stream of data stored on the storage media 48 within the media storage device 40.

For playback of a stream of packets on a single isochronous channel, such as the stream B, stored on the storage media 48 with packets received on other isochronous channels, the embedded stream processor 44 first finds the specific pattern of the cycle_mark field for each cycle. After finding the specific pattern of the cycle_mark field, the embedded stream processor 44 then verifies that this specific pattern does indeed represent the cycle_mark field within a meta-data header, as described above. After verifying that the specific pattern is within a cycle_mark field, the embedded stream processor 44 then reads the isochronous packet length information within the packet A and uses this data to skip to the beginning of the packet B. This packet B is then transmitted from the IEEE 1394-1995 serial bus interface circuit 42. Any data bytes for packet A are simply ignored during the read and transmit process, but are not erased from the storage media 48 within the media storage device 40. The embedded stream processor 44 determines the difference between the packets A and B, by examining the isochronous channel number in the headers of each packet. Accordingly, if packet B is stored on the storage media 48 before the packet A, the embedded stream processor 44 will be able to detect this condition. If an error condition occurs during playback of data packets received on one or more isochronous channels, stored with packets from multiple channels, the embedded stream processor 44 preferably recovers from the error condition in the same manner described above.

As described herein, the meta-data headers including the cycle_mark field and the cycle_count field are stored with packets of data received by a media storage device. These meta-data headers then allow the media storage device to locate appropriate boundaries and locations within the recorded stream of data during a playback operation in order to appropriately playback the recorded stream of data and recover from any error conditions that might occur. Preferably, an embedded stream processor is utilized within the media storage device to prepend the meta-data headers to the received stream of data and to control retrieving and error recovery operations during playback. The embedded stream processor also strips the meta-data headers from the recorded data during playback before the data is transmitted from the IEEE 1394-1995 serial bus interface of the media storage device.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

We claim:

1. A method of reading data from a media storage device which has previously been stored with header data generated by the media storage device, the header data comprising both a packet header and a meta data header comprising:

a. locating a first header data comprising a meta data header and including a cycle mark value having a pattern, wherein the pattern is used to locate cycle boundaries, and the first header data further includes a cycle count value specifying a cycle number of a cycle in which the previously stored packet of data was received, further wherein packets have been stored on the media storage device by grouping packets received on multiple channels within a same isochronous cycle into a cycle group of packets and adding the meta data header to the cycle group of packets;

b. reading a previously stored packet of data following the first header data from a media within the media storage device, the previously stored packet of data including a packet header;

c. stripping the first header data from the previously stored packet of data at the media storage device thereby forming an isochronous retrieved packet of data; and d. transmitting the isochronous retrieved packet of data over an isochronous channel to another device, wherein transfers over the isochronous channel take place such that time intervals between significant instances have a same duration at both transmitting and receiving applications.

2. The method as claimed in claim 1 wherein transmitting includes transmitting the manipulated packet of data onto a bus structure which complies with a version of an IEEE 1394 standard.

3. The method as claimed in claim 1 wherein stripping the first header data from the previously stored packet of data is performed by an embedded stream processor within the media storage device.

4. The method as claimed in claim 1 wherein the media storage device is a hard disk drive.

5. The method as claimed in claim 1 wherein locating the first header data, including a cycle mark value having a pattern includes locating the pattern within the previously stored data, then determining if a cycle count value within the first header data is within an appropriate range, determining if an isochronous header follows the first header data and then determining a data length value.

6. The method as claimed in claim 5 wherein the appropriate range is any number including and between 0 and 7999.

7. A computer readable medium comprising a meta data header added to isochronous received packets by a media storage device as the packets are recorded on storage media within the media storage device, each of the isochronous received packets including an existing header to which the meta data header is added such that the isochronous received packets include both an existing header and a meta data header, the meta data header comprising:
a. a cycle mark value including a pattern used to locate cycle boundaries within the received packets; and
b. a cycle count value specifying a cycle number of a cycle in which the received packets are received;
wherein packets are received on multiple channels, grouped with packets received on multiple channels within a same isochronous cycle into a cycle group of packets and the meta data header is added to each group of isochronous received packets received during the same isochronous cycle, wherein each of the isochronous received packets are received over an isochronous channel, and further wherein transfers over the isochronous channel take place such that time intervals between significant instances have a same duration at both transmitting and receiving.

8. The computer readable medium as claimed in claim 7 wherein the cycle count value has a range between and including 0 and 7999.

9. A media storage device comprising:
a. means for interfacing for receiving an isochronous stream of data over an isochronous channel, thereby forming a received isochronous stream of data, and also for transmitting a retrieved isochronous stream of data, the received stream of data including packet header data, wherein transfers over the isochronous channel take place such that time intervals between significant instances have a same duration at both transmitting and receiving applications;
b. means for storing data for storing and retrieving the received isochronous stream of data; and
c. means for processing coupled to the means for interfacing and to the means for storing for adding meta header data to the received isochronous stream of data as the received isochronous stream of data is received at the media storage device, such that each packet within the received isochronous stream of data includes both packet header data and meta header data, and providing the meta header data and the received isochronous stream of data to the means for storing for recording thereby forming a recorded stream of data, the meta header data including a cycle mark value marking cycle boundaries within the recorded stream of data;
wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

10. The media storage device as claimed in claim 9 wherein the means for processing is an embedded stream processor which also locates a first cycle mark value within the recorded stream of data during a playback operation, reads packets within the recorded stream of data after the first cycle mark value, strips the header data from read packets within the recorded stream of data thereby forming retrieved packets of data and transmits the retrieved packets of data through the means for interfacing to a receiving device.

11. The media storage device as claimed in claim 10 wherein the receiving device is coupled to the means for interfacing by a bus structure which complies with a version of an IEEE 1394 standard.

12. The media storage device as claimed in claim 10 wherein the embedded stream processor locates the first cycle mark value by locating a pattern included within the cycle mark value, then determining if a cycle count value within the header data is within an appropriate range, determining if an isochronous header follows the header data and then determining a data length value.

13. The media storage device as claimed in claim 12 wherein the appropriate range is any number including and between 0 and 7999.

14. The media storage device as claimed in claim 9 wherein the header data further includes a cycle count value specifying a cycle number of a cycle in which packets of data within the received stream of data were received.

15. A media storage device comprising:
a. an interface circuit to receive an isochronous stream of data over an isochronous channel, thereby forming a received isochronous stream of data, and also to transmit a retrieved isochronous stream of data, the received isochronous stream of data including packet header data, wherein transfers over the isochronous channel take place such that time intervals between significant instances have a same duration at both transmitting and receiving applications;
b. storage media configured to store and retrieve the received stream of data; and
c. an embedded stream processor coupled to the interface circuit and to the storage media to add meta header data to the received isochronous stream of data as it is received at the media storage device, such that each packet within the received isochronous stream of data includes both packet header data and meta header data, and provide the meta header data and the received isochronous stream of data to the storage media for recording to form a recorded stream of data, the meta header data including a cycle mark value marking cycle boundaries within the recorded stream of data;
wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

16. The media storage device as claimed in claim 15 wherein the embedded stream processor also locates a first cycle mark value within the recorded stream of data during a playback operation, reads packets within the recorded stream of data after the first cycle mark value, strips the header data from read packets within the recorded stream of data thereby forming retrieved packets of data and transmits the retrieved packets of data through the interface circuit to a receiving device.

17. The media storage device as claimed in claim 16 wherein the receiving device is coupled to the media storage device by a bus structure which complies with a version of an IEEE 1394 standard.

18. The media storage device as claimed in claim 16 wherein the embedded stream processor locates the first cycle mark value by locating a pattern included within the cycle mark value, then determining if a cycle count value within the header data is within an appropriate range, determining if an isochronous header follows the header data and then determining a data length value.

19. The media storage device as claimed in claim 18 wherein the appropriate range is any number including and between 0 and 7999.

20. The media storage device as claimed in claim 15 wherein the header data further includes a cycle count value specifying a cycle number of a cycle in which packets of data within the received stream of data were received.

21. A method of writing data to a media storage device comprising:
   a. receiving an isochronous received packet of data over an isochronous channel to be written to the media storage device, the isochronous received packet of data including a packet header and a common isochronous packet header, wherein transfers over the isochronous channel take place such that time intervals between significant instances have a same duration at both transmitting and receiving applications;
   b. adding a meta data header to the isochronous received packet of data at the media storage device thereby forming an extended packet of data which includes the packet header, the common isochronous packet header and the meta data header; and
   c. storing the extended packet of data onto a media within the media storage device;
wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

22. A media storage device comprising:
   a. an interface circuit to receive an isochronous stream of data over an isochronous channel, thereby forming a received isochronous stream of data, and also to transmit a retrieved isochronous stream of data, wherein transfers over the isochronous channel take place such that time intervals between significant instances have a same duration at both transmitting and receiving applications;
   b. storage media configured to store and retrieve the received isochronous stream of data, wherein the received isochronous stream of data includes one or more received isochronous packets of data, each including both a packet header and a common isochronous packet header; and
   c. an embedded stream processor coupled to the interface circuit and to the storage media to add a meta data header to each received isochronous packet in the received stream of data as it is received at the media storage device, thereby forming an extended packet of data, and provide the extended packet of data to the storage media for recording to form a recorded stream of data, the meta data header including a cycle mark value marking cycle boundaries within the recorded stream of data;
wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

23. A method of writing data to a media storage device comprising:
   a. receiving an isochronous received packet of data over an isochronous channel to be written to the media storage device, the isochronous received packet of data including a packet header, wherein the media storage device maintains the packet header with the received packet of data, wherein transfers over the isochronous channel take place such that time intervals between significant instances have a same duration at both transmitting and receiving applications;
   b. adding a meta data header to the isochronous received packet of data at the media storage device thereby forming an extended packet of data including both the packet header and the meta data header; and
   c. storing the extended packet of data onto a media within the media storage device;
wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

24. A computer readable medium comprising a meta data header added to isochronous received packets by a media storage device as the packets are recorded on storage media within the media storage device, each of the isochronous received packets including an existing header, wherein the media storage device maintains the existing header with the isochronous received packets, the meta data header comprising:
   a. a cycle mark value including a pattern used to locate cycle boundaries within the received packets; and
   b. a cycle count value specifying a cycle number of a cycle in which the received packets are received;
wherein packets are received on multiple channels, grouped with packets received on multiple channels within a same isochronous cycle into a cycle group of packets and the meta data header is added to each group of isochronous received packets received during the same isochronous cycle, wherein each of the isochronous received packets are received over an isochronous channel, and further wherein transfers over the isochronous channel take place such that time intervals between significant instances have a same duration at both transmitting and receiving applications.

25. A media storage device comprising:
   a. an interface circuit configured to receive an isochronous stream of data over an isochronous channel, thereby forming a received isochronous stream of data, and also to transmit a retrieved isochronous stream of data, the received stream of data including packet header data, wherein transfers over the isochronous channel take place such that time intervals between significant instances have a same duration at both transmitting and receiving applications;
b. storage media configured to store and retrieve the received isochronous stream of data; and
c. an embedded stream processor coupled to the interface circuit and to the storage media to add meta header data to the received isochronous stream of data as it is received at the media storage device and provide the meta header data and the received isochronous stream of data, including the packet header data, to the storage media for recording to form a recorded stream of data, the meta header data including a cycle mark value marking cycle boundaries within the recorded stream of data;

wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

26. A method of writing data to a media storage device comprising:
a. receiving an isochronous received packet of data over an isochronous channel to be written to the media storage device, the isochronous received packet of data including a packet header, wherein transfers over the isochronous channel take place such that time intervals between significant instances have a same duration at both transmitting and receiving applications;
b. adding a meta data header to the isochronous received packet of data at the media storage device thereby forming an extended packet of data including both the packet header and the meta data header; and
c. storing the extended packet of data onto a media within the media storage device;

wherein receiving the received packet of data includes receiving packets of data on multiple channels and further wherein adding a meta data header to the received packet of data includes grouping packets received on multiple channels within a same isochronous cycle into a cycle group of packets and adding the meta data header to the cycle group of packets.

27. The method as claimed in claim 26 wherein the meta data header includes a cycle mark value which includes a pattern used to locate cycle boundaries, and a cycle count value specifying a cycle number of a cycle in which the isochronous received packet of data was received.

28. The method as claimed in claim 26 wherein adding a header to the isochronous received packet of data is performed by an embedded stream processor within the media storage device.

29. The method as claimed in claim 26 wherein the isochronous received packet of data is received from a bus structure which complies with a version of an IEEE 1394 standard.

30. The method as claimed in claim 26 wherein the media storage device is a hard disk drive.

31. A method of writing data to a media storage device comprising:
a. receiving from a bus structure which complies with a version of an IEEE 1394 standard, isochronous received packets of data over multiple isochronous channels to be written to the media storage device, each of the isochronous received packets of data including a packet header, wherein transfers over isochronous channels take place such that time intervals between significant instances have a same duration at both transmitting and receiving applications;
b. adding a meta data header to each of the isochronous received packets of data at the media storage device thereby forming extended packets of data each including both the packet header and the meta data header, wherein the meta data header includes a cycle mark value which includes a pattern used to locate cycle boundaries, and a cycle count value specifying a cycle number of a cycle in which the isochronous received packet of data was received and further wherein adding a meta data header to the received packets of data includes grouping packets received on multiple channels within a same isochronous cycle into a cycle group of packets and adding the meta data header to the cycle group of packets; and
c. storing the extended packets of data onto a media within the media storage device.

* * * * *